United States Patent [19]

Freye et al.

[11] Patent Number: 4,569,439
[45] Date of Patent: Feb. 11, 1986

[54] ROUND BALES OF AGRICULTURAL BLADE CROPS

[75] Inventors: Theodor Freye, Oelde; Bernd Hollmann, Bielefeld, both of Fed. Rep. of Germany

[73] Assignee: Claas OHG, Harsewinkel, Fed. Rep. of Germany

[21] Appl. No.: 769,789

[22] Filed: Aug. 26, 1985

Related U.S. Application Data

[63] Continuation of Ser. No. 515,703, Feb. 20, 1983.

[30] Foreign Application Priority Data

Jul. 21, 1982 [DE] Fed. Rep. of Germany ....... 3227160

[51] Int. Cl.⁴ ...................... B65D 71/00; B65B 13/02
[52] U.S. Cl. ...................... 206/83.5; 53/461; 100/15; 206/417; 206/442
[58] Field of Search ...................... 53/461–466; 100/1–3, 10, 11, 15, 33, 34, 912; 206/83.5, 410, 417, 442, 497

[56] References Cited

U.S. PATENT DOCUMENTS

| 417,782 | 12/1889 | Glover | 206/83.5 |
|---|---|---|---|
| 518,820 | 4/1894 | Mallett | 206/83.5 |
| 1,256,505 | 2/1918 | Nesbitt | 206/83.5 |
| 1,293,451 | 2/1919 | Irvin | 206/83.5 |
| 1,846,949 | 2/1932 | Clark | 206/83.5 |
| 2,127,118 | 8/1938 | Herbelin | 206/83.5 |
| 2,367,168 | 1/1945 | Cheesman | 100/2 |
| 2,480,501 | 8/1949 | Moore | 53/463 |
| 2,705,557 | 4/1955 | Hartman | 206/83.5 |
| 2,893,308 | 7/1959 | Bodisch | 100/15 |
| 2,971,643 | 2/1961 | Farley | 206/83.5 |
| 3,451,185 | 6/1969 | Tezuka | 206/83.5 |
| 3,647,061 | 3/1972 | Kaupin | 206/83.5 |
| 3,674,139 | 7/1972 | Manasian et al. | 206/83.5 |
| 3,867,878 | 2/1975 | Buhne | 100/2 |
| 4,017,713 | 4/1977 | Lodi | 53/463 |
| 4,248,343 | 2/1981 | Schaefer | 206/83.5 |
| 4,333,301 | 6/1982 | Koutonen et al. | 100/15 |
| 4,362,001 | 12/1982 | Cockerham, Jr. et al. | 53/465 |

FOREIGN PATENT DOCUMENTS

| D692761 | 11/1930 | France | 206/83.5 |
|---|---|---|---|
| 1029927 | 5/1966 | United Kingdom | 87/12 |

*Primary Examiner*—George E. Lowrance
*Assistant Examiner*—Jimmy G. Foster
*Attorney, Agent, or Firm*—Pollock, Vande Sande and Priddy

[57] ABSTRACT

A wrapping of netting is disclosed for a round bale of agricultural blade crops. The use of netting as a wrapping permits the elimination of all additional measures for fastening of the wrapping which have so far been customary and necessary with any other wrapping materials.

5 Claims, 4 Drawing Figures

ROUND BALES OF AGRICULTURAL BLADE CROPS

This application is a continuation of application Ser. No. 515,703, filed Feb. 20, 1983, for Round Bales of Agricultural Blade Crops.

TECHNICAL FIELD

The invention concerns a round bale of agricultural blade crops with an encircling wrapping to hold its the shape.

BACKGROUND ART

It is known to provide round bales of agricultural blade crops with a wrapping to hold their shape, the wrapping being from a flexible plastic foil or film (DE-OS 22 19 976). This film can have small holes (DE-AS 27 05 101). With the known round bales which are wrapped with film, it was necessary to fasten the film by welding, clamping or gluing. Such a fastening is expensive.

DISCLOSURE OF THE INVENTION

The invention is based on the task to create a round bale of the type mentioned with a wrapping which is made in an especially simple way and is easy to apply.

The solution to this task was brought about according to the invention by the use of a wrapping comprising a netting which is essentially non-extensible in the direction of the wrapping, the overlapping end of which clings to the netting below and possibly to the penetrating blade crop. It is of special advantage if the netting has sufficient clinging power in its touching areas, which are sufficient to fasten the bale. It has proven advantageous to use netting with a coarse mesh. Further characteristics of the invention can be seen in the subclaims and the description of the drawings.

The use of netting as wrapping has another surprising advantage in that the clining between the netting layers themselves and between the netting layers and the blade crops makes unnecessary the use of an additional tie or fastener for the net,—which so far had been considered unavoidable. Depending on the quality and design of the netting used, it is sufficient to calculate a length of less then half the circumference of the bale as overlap. After rolling on the netting, the round bale is fastened. Even after a lengthy storage it will not loosen.

BRIEF DESCRIPTION OF THE DRAWINGS

A preferred design of the invention is described below, with reference to the accompanying drawings in which.

BEST MODE FOR CARRYING OUT THE INVENTION

Figure 1:
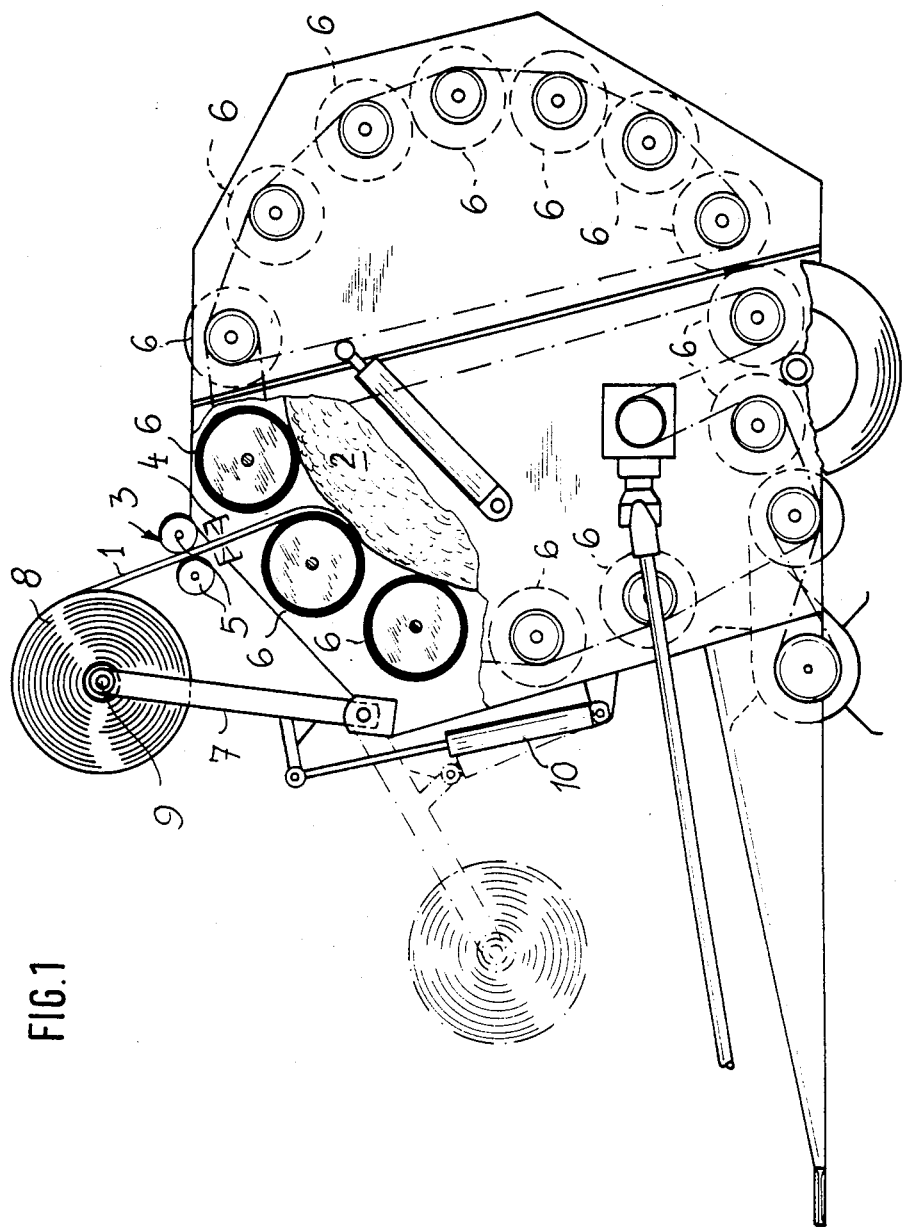
FIG. 1 is a schematic view of a round bale press.
Figure 2:
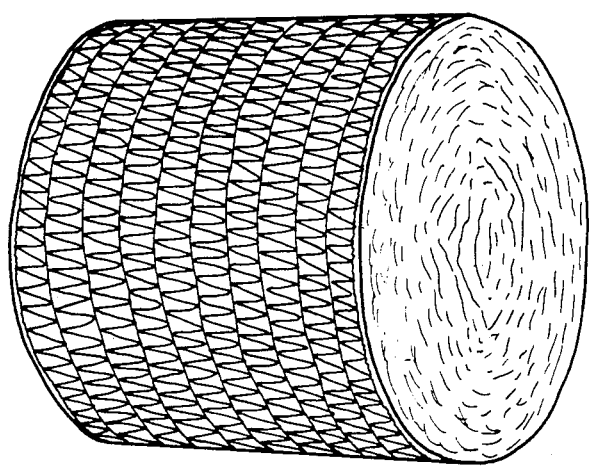
FIG. 2 is a perspective view of a round bale with netting wrap.

FIG. 1 is a schematic view of a conventional round bale press. A number of pressing rollers 6 are arranged along the circumference of the round bale press. These pressing rollers are rotated to cause the rolling-up and compressing of the blade crop which is fed in. A supply roll 8 is installed pivotably on an axis 9 between two arms 7 which are parallel to each other. The arms 7 and the axis 9 can be turned from the position drawn in solid lines on FIG. 1 to the position shown in a dot-dash-line by means of a piston-cylinder unit 10.

The netting 1 runs off the supply roll 8. It is pulled off by the two pre-set rollers. The supply roll 8 is stopped. A device for measuring length 3 is connected to the pre-set rollers 5 or installed nearby. A cutting device 4 for the netting is also installed near the entry point of the netting. The cutting is done in dependence on the pulled off length.

Figure 3:
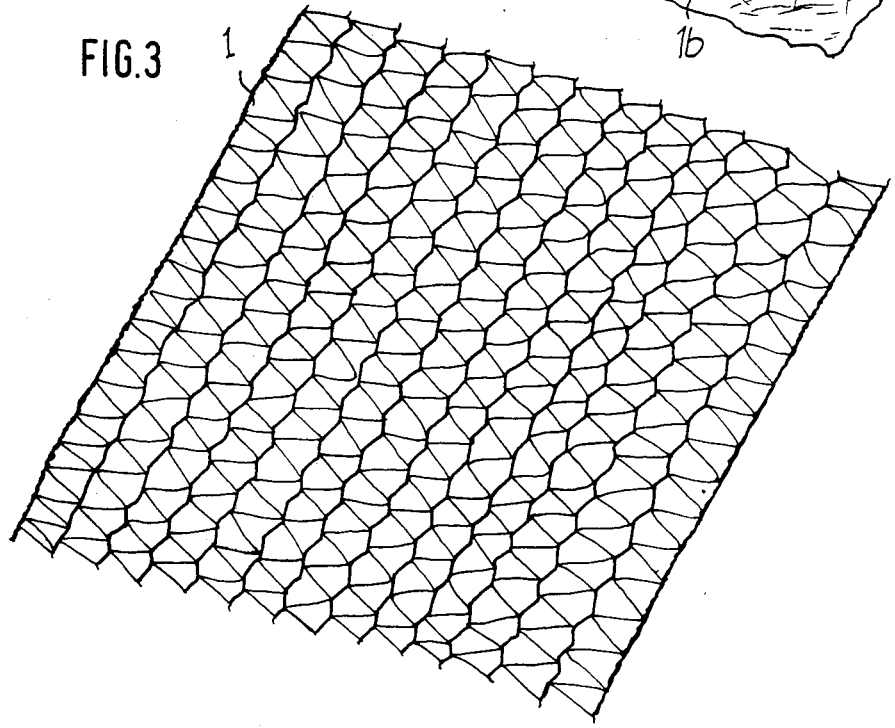
FIG. 3 is a view of a segment of a typical netting.

In its lengthwise direction, i.e. in the direction of revolution, the netting 1 is essentially inflexible or inextensible. However, in the crosswise direction it is flexible or extensible. See FIG. 3 for an example of such netting.

Figure 4:
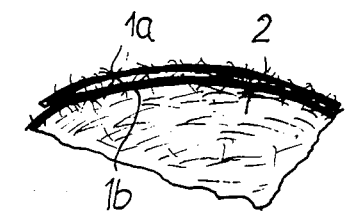
FIG. 4 is a fragmentary cross-section of the netting and a part of the round bale in the area where the netting overlaps.

The overlapping areas 1b and 1a shown in FIG. 4 cling to each other. The clinging is reinforced by the blade crop which penetrates radially towards the outside through the openings in the netting. The netting strip 1 which is rolled on the supply roller 8 has predetermined tearing sites at pre-set length intervals. These tearing sites go across the whole width of the netting. Such tearing sites permit the construction of the cutting device 4 as a tearing device. It is also possible to construct the separating device as a cutting device, for example, or a device to separate by welding.

The netting 1 may also be a Raschel web. Such webbed nettings are made on a Raschel loom. Usually threads or ribbons are used, preferably made from synthetic material such as polyolefines. Polyolefine ribbons or polyolefine fibres are usually pre-stretched. Polyethylene is suitable.

Such Raschel web nets of polyolefine ribbons are used for the manufacture of netlike packing sacks. The mesh width of the net varies between 5 mm and 50 mm. Preferably, 2 to 3 mm wide ribbons of stretched film are used, whereby the thickness of the film is in the range of 25 μm.

The expression "netting" used in this application also includes a special type of such netting, such as the mentioned netting web, which is within the state of the art.

We claim:

1. A round bale of agricultural blade crops, comprising: a rolled cylindrical body of blade crops; and a length of open mesh wrapper netting made from synthetic material and extending around the circumference of said body, said length having overlaping ends which are flexible in a direction transverse to the direction of wrap around said body and which cling to each other to fasten said length about said body, portions of said blade crops extending radially from said body through the mesh openings in said overlapping ends to reinforce the clinging of said overlapping ends to each other, said netting being essentially inextensible in the direction of wrap around said body, whereby said wrapper netting holds the shape of said body without requiring additional fasteners or ties.

2. A bale according to claim 1, wherein said material is polyethylene.

3. A press for round bales of agricultural blade crops, the press having a center axis, comprising:

a plurality of pressure rollers for forming blade crops fed into said press into a cylindrical bale of compressed blade crops with the axis of said cylindrical bale being coincident with said center axis of said press;

a supply roll of open mesh wrapper netting of synthetic material, said netting being substantially inextensible in its length direction and being extensible in its width direction;

means for mounting said roll for rotation parallel to said center axis of said press;

means for feeding an elongated section of wrapper netting in the length direction of said netting from said roll into said press to wrap a cylindrical bale of blade crops therein, said section of wrapper netting having overlapping ends which are flexible in the width direction of said elongated section and which cling to each other to fasten said section about such a bale without requiring additional fasteners or ties, portions of the blade crops in such a bale extending outwardly of the bale through the mesh openings in said overlapping ends to reinforce the clinging of said overlapping ends to each other;

means for measuring the length of the section of wrapper netting that is fed from said roll into said press; and means for separating said elongated section of wrapper netting from said roll.

4. A press according to claim 3, wherein said roll is pivotably mounted by said means for mounting on an axis parallel to the axis of rotation of said roll.

5. A press according to claim 4, wherein said wrapper netting has pre-set tearing strips across its width at predetermined intervals.

* * * * *